United States Patent
Morgan et al.

(10) Patent No.: US 11,728,050 B2
(45) Date of Patent: Aug. 15, 2023

(54) METHODS OF MOVING AN INDUCTION COIL TO MOVE A CONTROL ELEMENT IN A NUCLEAR REACTOR

(71) Applicant: GE-Hitachi Nuclear Energy Americas LLC, Wilmington, NC (US)

(72) Inventors: Kenneth A. Morgan, Wilmington, NC (US); David L. Major, Wilmington, NC (US); Randy M. Brown, Wilmington, NC (US); Gerald A. Deaver, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 612 days.

(21) Appl. No.: 17/107,878

(22) Filed: Nov. 30, 2020

(65) Prior Publication Data
US 2021/0225533 A1 Jul. 22, 2021

Related U.S. Application Data

(62) Division of application No. 15/644,908, filed on Jul. 10, 2017, now Pat. No. 10,872,703.

(Continued)

(51) Int. Cl.
*G21C 7/14* (2006.01)
*G21C 7/12* (2006.01)
(Continued)

(52) U.S. Cl.
CPC ............... *G21C 7/14* (2013.01); *G21C 7/12* (2013.01); *G21C 9/02* (2013.01); *F16B 2001/0035* (2013.01); *Y02E 30/30* (2013.01)

(58) Field of Classification Search
CPC .... G21C 7/14; G21C 7/12; G21C 9/02; F16B 2001/0035

(Continued)

(56) References Cited

U.S. PATENT DOCUMENTS

| 3,566,224 A | * | 2/1971 | Vallauri | G21C 7/12 |
|  |  |  |  | 310/14 |
| 2016/0307652 A1 | * | 10/2016 | Arlaud | G21C 7/14 |

FOREIGN PATENT DOCUMENTS

| FR | 3016075 A1 | * | 7/2015 | ............... G21C 7/12 |
| JP | S57168192 A | * | 10/1982 | ............... G21C 7/14 |
| JP | S61215992 A | * | 9/1986 | ............... G21C 7/14 |

* cited by examiner

*Primary Examiner* — Jack W Keith
*Assistant Examiner* — Daniel Wasil
(74) *Attorney, Agent, or Firm* — Ryan Alley IP

(57) ABSTRACT

Control rod drives include linearly-moveable control elements inside an isolation barrier. Control rod drives move the control element through secured magnetic elements subject to magnetic fields. Induction coils may generate magnetic fields and be moveable across a full stroke length of the control element in the reactor. A motor may spin a linear screw to move the induction coils on a vertical travel nut. A control rod assembly may house the magnetic elements and directly, removably join to the control element. The control rod assembly may lock with magnetic overtravel latches inside the isolation barrier to maintain an overtravel position. Overtravel release coils outside the isolation barrier may release the latches to leave the overtravel position. Operation includes moving the induction coils with a linear screw to drive the control element to desired insertion points, including full insertion by gravity following de-energization. No direct connection may penetrate the isolation barrier.

20 Claims, 4 Drawing Sheets

Related U.S. Application Data

(60) Provisional application No. 62/361,628, filed on Jul. 13, 2016, provisional application No. 62/361,604, filed on Jul. 13, 2016, provisional application No. 62/361,625, filed on Jul. 13, 2016.

(51) Int. Cl.
*G21C 9/02* (2006.01)
*F16B 1/00* (2006.01)

(58) Field of Classification Search
USPC .......................................................... 376/228
See application file for complete search history.

METHODS OF MOVING AN INDUCTION COIL TO MOVE A CONTROL ELEMENT IN A NUCLEAR REACTOR

RELATED APPLICATIONS

This application claims priority under 35 U.S.C. § 119 to U.S. Provisional Applications 62/361,604; 62/361,625; 62/361,628, all filed Jul. 13, 2016, and is a divisional of, and claims priority under 35 U.S.C. §§ 120 & 121 to, co-pending U.S. application Ser. No. 15/644,908, filed Jul. 10, 2017, and incorporated by reference herein in their entireties.

BACKGROUND

FIG. 1 is an illustration of a drive rod-control rod assembly (CRA) connection 10 useable with example embodiment control drives. In most conventional PWR control rod assemblies, drive rod 11 and actuating rod 12 extend in lateral support tube 16 from above a reactor pressure vessel 1 down to a lockable spud or bayonet 13 that joins to CRA 15 via locking plug 14. CRA 15 contains neutron absorbent materials what can be used to control a nuclear chain reaction based on an amount of vertical insertion. Control rods are driven from above by vertical movement of actuating rod 12 and drive rod 13, under force from the control rod drive mechanism.

The following documents are incorporated herein by reference in their entireties: US Pat Pub 2015/0255178 to Tsuchiya et al; U.S. Pat. No. 4,423,002 to Wiart et al.; U.S. Pat. No. 4,369,161 to Martin; U.S. Pat. No. 4,338,159 to Martin et al.; U.S. Pat. No. 4,044,622 to Matthews; U.S. Pat. No. 9,305,669 to Hyde et al.; U.S. Pat. No. 3,933,581 to McKeehan et al.; U.S. Pat. No. 4,048,010 to Eschenfelder et al.; U.S. Pat. No. 4,092,213 to Nishimura; U.S. Pat. No. 4,147,589 to Roman et al.; U.S. Pat. No. 4,288,898 to Adcock; U.S. Pat. No. 4,484,093 to Smith; U.S. Pat. No. 5,276,719 to Batheja; U.S. Pat. No. 8,915,161 to Akatsuka et al.; U.S. Pat. No. 4,518,559 to Fischer et al.; U.S. Pat. No. 5,517,536 to Goldberg et al.; U.S. Pat. No. 5,428,873 to Hitchcock et al.; U.S. Pat. No. 8,571,162 to Maruyama et al.; U.S. Pat. No. 8,757,065 to Fjerstad et al.; U.S. Pat. No. 5,778,034 to Tani; U.S. Pat. No. 9,336,910 to Shargots et al.; U.S. Pat. No. 3,941,653 to Thorp, II; U.S. Pat. No. 3,992,255 to DeWesse; U.S. Pat. No. 8,811,562 to DeSantis; and "In-vessel Type Control Rod Drive Mechanism Using Magnetic Force Latching for a Very Small Reactor" Yoritsune et al., J. Nuc. Sci. & Tech., Vol. 39, No. 8, p. 913-922 (August 2002).

SUMMARY

Example embodiments include control rod drives including linearly-moveable control elements to control neutronics in a nuclear reactor. Example control rod drives may include an isolation barrier impermeably separating pressurized reactor internals from external spaces like containment. One or more induction coils are linearly moveable outside of the isolation barrier, while the control element is inside the isolation barrier in the reactor. Example control rod drives may move the control element via a magnet immovably connected to the same by linearly moving the induction coils to linearly drive the magnets. The induction coils may be mounted on a vertical travelling nut and linear screw to fully move across a whole distance equivalent to complete insert and withdrawal of the control element from the reactor. A closed coolant loop may cool the induction coils, which may otherwise be maintained in a vacuum or other environment distinct from reactor internals in a housing about an end of the reactor. Example embodiment control rod drives may include a control rod assembly housing the magnet that directly joins to the control element. The control rod assembly may lock with magnetic overtravel latches inside the isolation barrier to maintain an overtravel position. Overtravel release coils outside the isolation barrier can release or otherwise move the latches, which may be spring-biased, to adjust the connection between the latches and assembly.

Example methods include linearly moving the induction coil to drive the control element via the magnetic material secured to the same. In this way, the control element may be inserted and withdrawn with no mechanical linkage permeating the isolation barrier. By mounting the induction coil on a vertical travelling nut that moves linearly with rotation of a linear screw, the magnetic material may be driven with the moving induction coil, thus driving the control element. A motor can rotate the linear screw outside the isolation barrier to achieve this motion. When the coil is de-energized, the control element may be driven by gravity into a reactor, achieving a scram. Example methods may drive the control rod to an overtravel position, where overtravel latches hold the same, for removal, attachment, and/or other maintenance of the control element from/to/on the control rod assembly. Following desired overtravel actions, the overtravel coils may be energized to release the latches through magnetic materials in the latch biasing them to an open position.

BRIEF DESCRIPTIONS OF THE DRAWINGS

Example embodiments may become more apparent by describing, in detail, the attached drawings, wherein like elements are represented by like reference numerals, which are given by way of illustration only and thus do not limit the terms which they depict.

DETAILED DESCRIPTION

Figure 1:
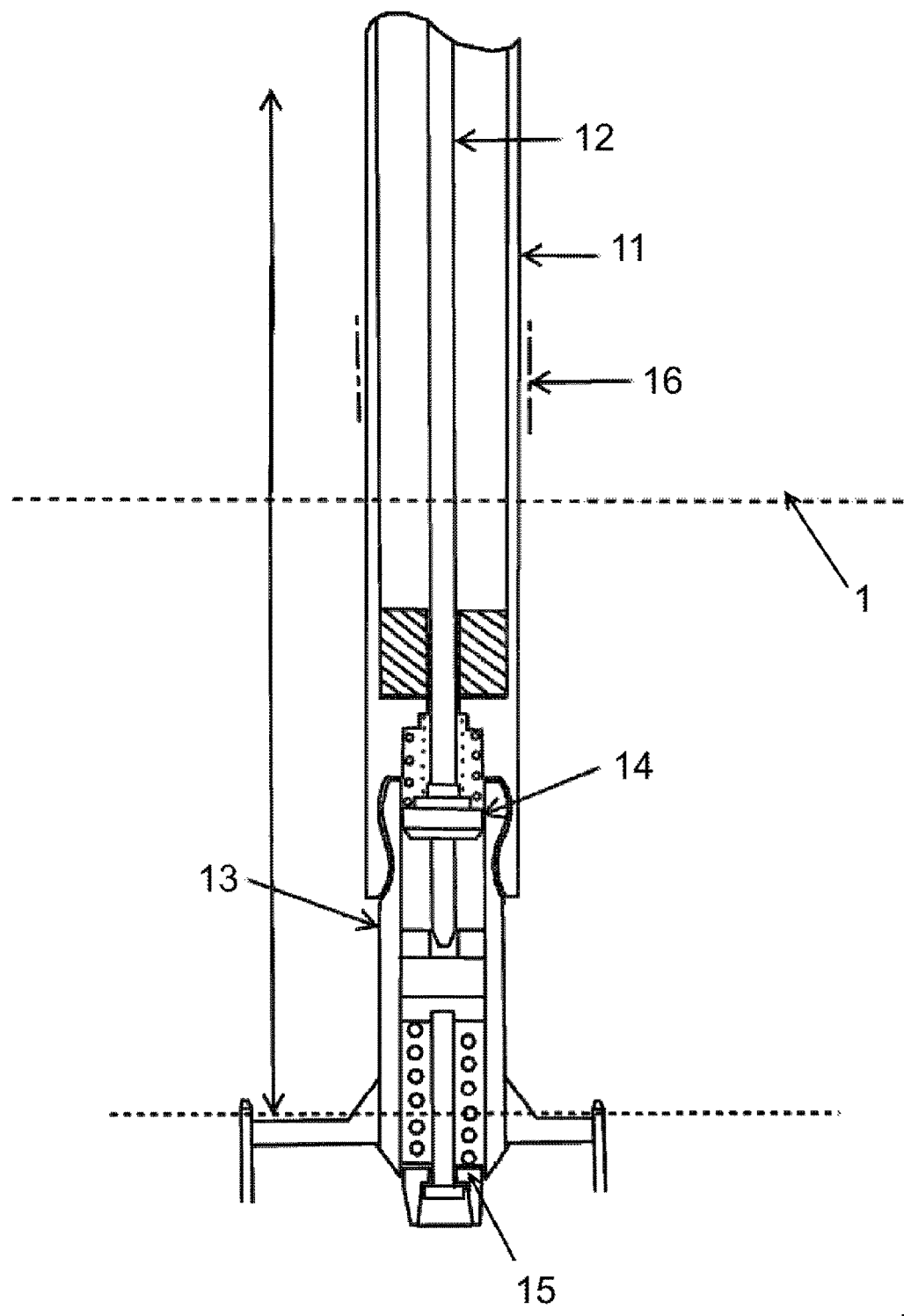
FIG. 1 is an illustration of a drive rod connection to a control rod assembly useable in example embodiments.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It may be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It may be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It may be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

The Inventors have newly recognized that control rod drives in nuclear reactors are typically mechanical drives using direct contact points that must pass through or be inside a reactor CRDM pressure boundary 150. Such direct contact and positioning creates a challenging environment for the mechanical drives that typically must operate to move control rods over a period of several months or years without maintenance. For example, reactor temperatures, leaked coolant, and noncondensible gasses found inside example embodiment CRDM 200 pressure boundary 150 can cause corrosion and associated stress corrosion cracking, hydriding, and hydrogen deflagration problems with mechanical drive parts. The cooling mechanisms and heat from direct contact with the drives interact with example embodiment CRDM 200 pressure boundary 150 to also cause thermal cycling problems during actuation of mechanical drives over the course of operation. Penetrations in a control rod drive required for mechanical connection also represent an avenue for leakage of reactor coolant. The Inventors have newly recognized a need for a control rod drive that has less engagement with example embodiment CRDM 200 pressure boundary 150 as well as mechanical contacts that represent high-failure points. Example embodiments described below uniquely enable solutions to these and other problems discovered by the Inventors.

Positioning and Scramming the CRDM

Figure 2:
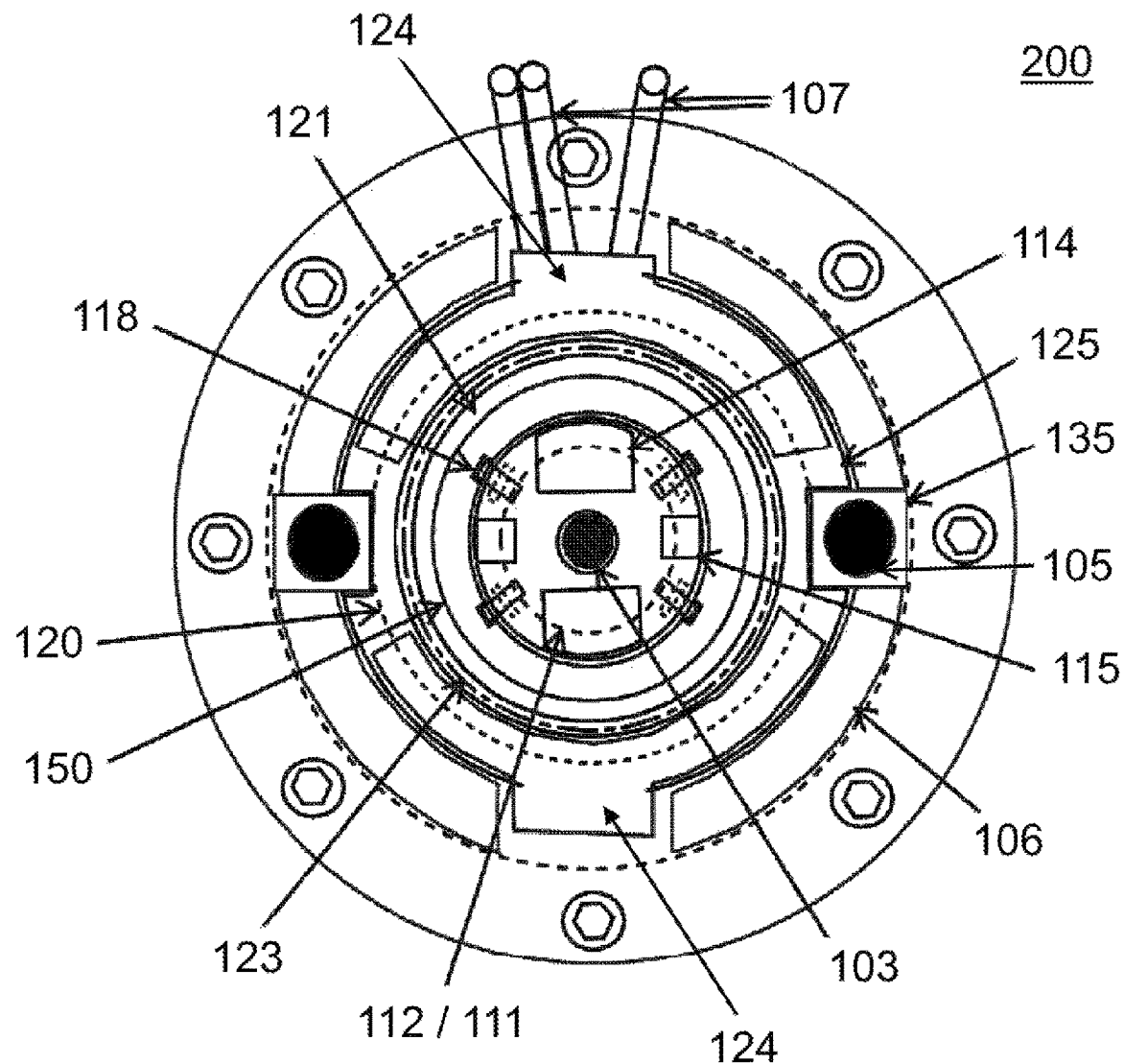
FIG. 2 is a plan illustration of an example embodiment control rod drive mechanism using extended lift coils.
Figure 3:
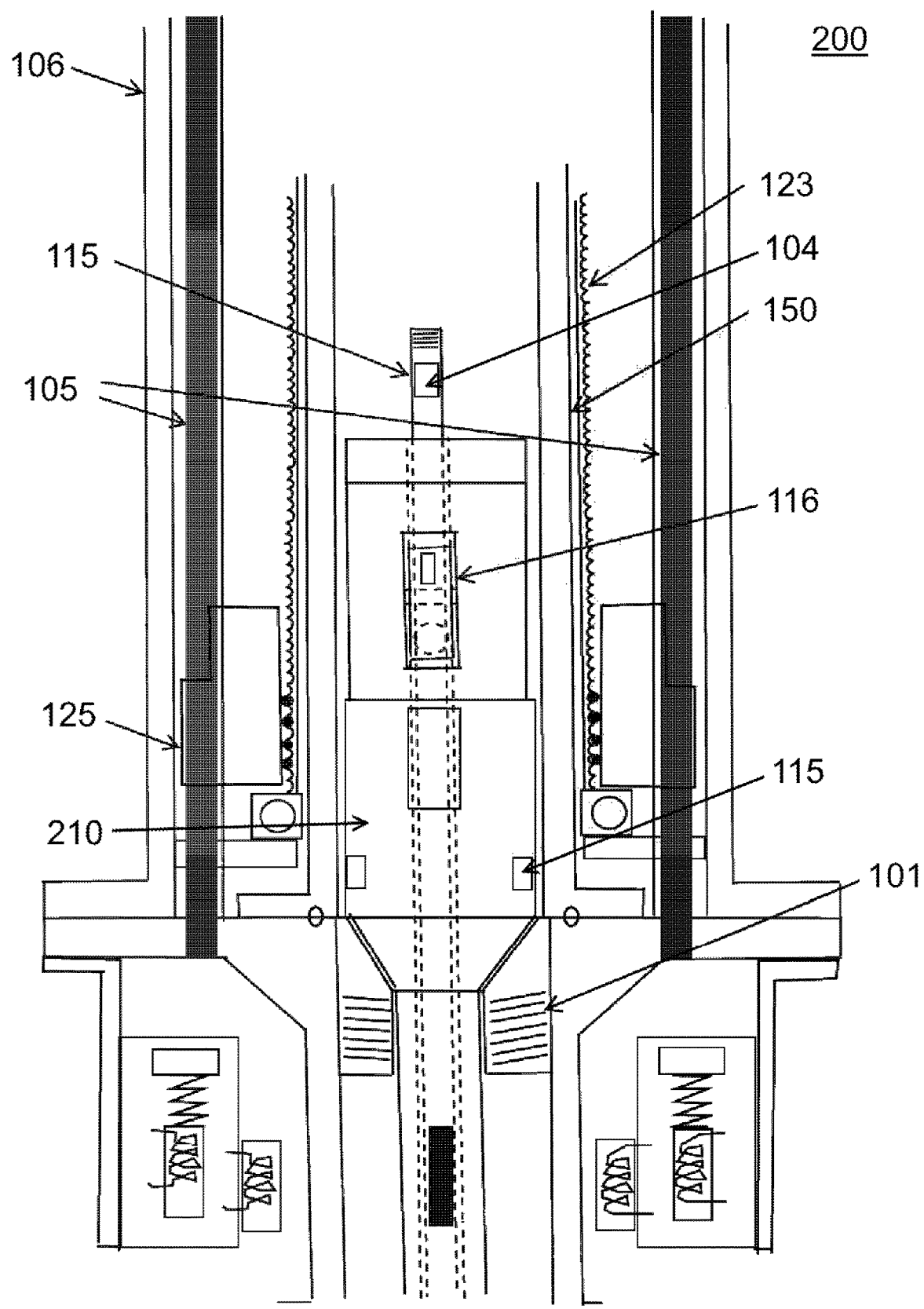
FIG. 3 is a profile illustration of the example embodiment control rod drive mechanism using extended lift coils.
Figure 4:
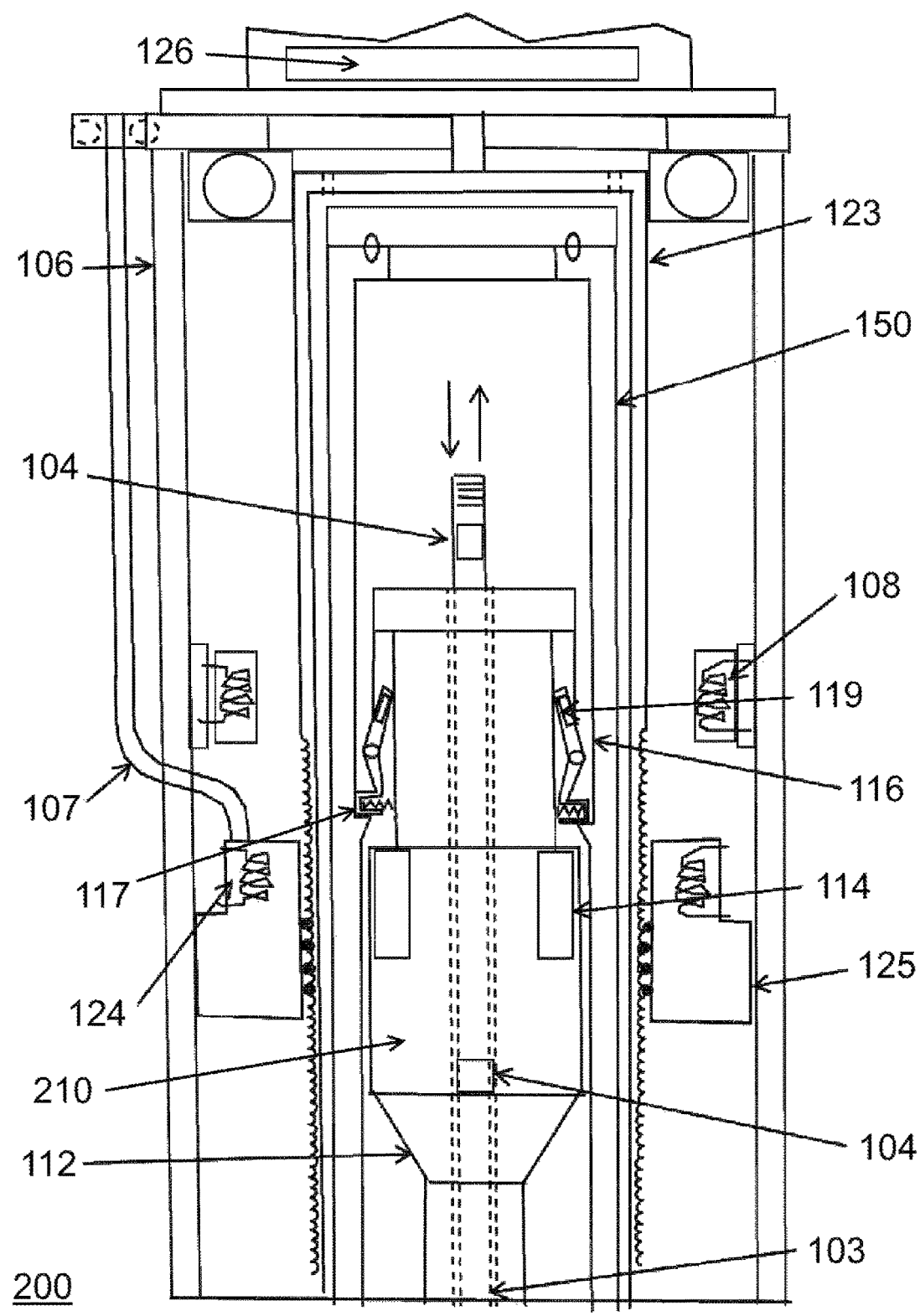
FIG. 4 is another profile illustration of the example embodiment control rod drive mechanism using extended lift coils.

FIG. 2 is a plan view illustration of an example embodiment control rod drive mechanism 200. FIGS. 3 and 4 are profile views of the same example embodiment control rod drive mechanism 200 of FIG. 2, with FIG. 3 showing assembly 210 in a seated position and FIG. 4 showing assembly 210 in an overtravel position. Co-owned application Ser. No. 15/640,428 filed Jun. 30, 2017 to Morgan et al. for "STATIONARY ISOLATED ROD COUPLINGS FOR USE IN A NUCLEAR REACTOR CONTROL ROD DRIVE" is incorporated herein by reference in its entirety. Descriptions of actuating rod 103, position indication magnet 115, lift rod actuating magnet 104, key features 118, are given in the incorporated '428 application As seen in FIG. 4, following coupling of lift rod 112 and drive rod 111 to CRA 210, CRA 210 is positioned by outer linear screw 123 and scram coils 124. Levitating and scram coils 124 are mounted on outer vertical travel nut 125 and are energized to magnetically couple lift rod 112 via lift magnet 114 or other materials within an isolation barrier such as example embodiment CRDM 200 pressure boundary 150. CRDM Motor 126 rotates outer linear screw 123 within CRDM structural housing 106. Rotation of outer linear screw 123 causes vertical movement of outer vertical travel nut 125 and levitating and scram coils 124 that are keyed to prevent rotation by position indication probe housing 135. Outer vertical travel nut 125 and energized levitating and scram coils 124 are moved vertically on outer linear screw 123 within the drive range. Levitated lift rod 111, drive rod 112, and CRA 210 follow the magnetic field. Feedback from position sensors and position indication probes 105 control outer linear screw 123 rotation and move CRA 210 in CRDM 200 to its desired position for reactor control. Outer linear screw 123 provides fine motion control of internal lift rod 111, drive rod 112 and CRA 210.

There is a vacuum 121 between example embodiment CRDM 200 pressure boundary 150 and outer linear screw 123 and between levitating and scram coils 124 and outer linear screw 123 to limit heat transfer between coils 124 and CRDM pressure boundary 150. Vacuum 121 may provide a more uniform temperature gradient on example embodiment CRDM 200 pressure boundary 150 that minimizes thermal cycling.

Simplification of example embodiment CRDM 200 pressure boundary 150 and lift rod internals may allow the size of CRDM pressure boundary 150 to be reduced such that example embodiment CRDM 200 pressure boundary 150 wall thickness can be enhanced to minimize effects of corrosion, hydriding, and hydrogen deflagration problems.

Reactor safety features requiring a scram provide inputs to the control system for levitating and scram coils 124 (in their energized state). If reactor conditions warrant a scram, the control system de-energizes levitating and scram coils 124. This drops the magnetic field levitating lift rod 111, drive rod 112, and CRA 210, and gravity quickly acts on the unsupported weight to scram the reactor. Any CRDM failure causing a loss of scram coil current may also lead to a conservative control rod scram.

Levitating and scram coils 124 are continuously energized during CRDM operation and may use a cooling flow through their travel range. Flexible coolant inlet/outlet lines 107 (FIG. 4) are oriented from the top of CRDM 200 and reach levitating and scram coils 124 through slotted openings of CRDM structural housing 106. Coolant inlet/outlet lines 107 along with the control circuits for levitating and scram coil 124 can have counter weights or spring reel feeds to keep them under slight tension during drive operation.

CRDM Preparation for Refueling Process

Drive rod 111 may be decoupled from CRA 210 as described in the incorporated '428 application. Outer linear screw 123, vertical travelling nut 125, and energized levitating and scram coils 124 are then used to maneuver lift rod 112 and drive rod 111 to an overtravel position as shown in FIG. 3. In the overtravel position, two spring-actuated overtravel latches 116 engage a shoulder or window in example embodiment CRDM 200 pressure boundary 150 to lock CRA 210 at the overtravel height. Power can then be secured to or disconnected from motor 126 (FIG. 4) and levitating and scram coils 124 (FIGS. 2 & 4) for duration of the refueling process. The lower end of drive rod 112 is carried to an elevation that is clear of the upper to lower vessel disassembly process.

When refueling is completed, motor 126, outer linear screw 123, and levitating and scram coil 124 are energized to carry the weight of lift rod 112 and drive rod 111 in the overtravel position. Overtravel release coils 108 are then energized to compress spring actuated structural support 117 resting on example embodiment CRDM 200 pressure boundary 150 structural support. Magnetic material 119 drawn outward on overtravel latches 116 causes the spring actuated structural support 117 to clear example embodiment CRDM 200 pressure boundary 150 structural support and the drive can be positioned to recouple to CRA 210 for operation.

CRDM Support Structure

As shown in FIG. 2, CRDM pressure boundary 150 is supported vertically off of the CRDM nozzle pressure boundary flange 120 in CRDM structural housing 106 of the RPV flange. Lateral support to upper portions of CRDM pressure boundary 150 is not provided other than the close proximity of linear screw 123 across vacuum gap 121.

CRDM structural housing 106 is also fixed to CRDM nozzle pressure boundary flange 120. Insulating washers and other items can be utilized to reduce the thermal heat transfer from the RPV head to components in CRDM 200. The internal bearings/bushings of rotating linear screw 123 are supported from CRDM structural housing 106 and not pressure boundary 150 to avoid heat conduction. PIP probes 105 are inserted vertically through the upper flange of CRDM structural housing 106 and are laterally supported at a minimum of the upper and lower ends of CRDM structural housing 106. Motor 126, brake, and position sensors may be mounted on the top end of CRDM structural housing 106 and engage outer linear screw 123 through a geared coupling. Cooling lines 107 are run to motor 126 which is located as remote as possible from the reactors thermal and radiation output. Motor 126 may also be isolated by a vacuum 121 from CRDM pressure boundary 150.

Example embodiments and methods thus being described, it may be appreciated by one skilled in the art that example embodiments may be varied and substituted through routine experimentation while still falling within the scope of the following claims. For example, a generally vertical orientation with control rod drives above a pressure vessel is shown in connection with some examples; however, other configurations and locations of control rods and control rod drives, are compatible with example embodiments and methods simply through proper dimensioning and placement—and fall within the scope of the claims. Such variations are not to be regarded as departure from the scope of these claims.

What is claimed is:

1. A method of moving a control element in a nuclear reactor, the method comprising:
   moving an induction coil outside of an isolation barrier and in a vacuum environment, wherein the moving drives a magnet secured to the control element, wherein the magnet and the control element are inside of the isolation barrier and in a pressurized reactor environment such that the control element linearly moves inside the isolation barrier exactly with the induction coil.

2. The method of claim 1, further comprising:
   energizing the induction coil before the moving the induction coil.

3. The method of claim 2, further comprising:
   de-energizing the induction coil to drive the control element by gravity into a reactor.

4. The method of claim 1, wherein the control rod drive includes a control rod assembly secured to the control element, and wherein the control rod assembly includes the magnet.

5. The method of claim 1, wherein the induction coil and the isolation barrier are sealed inside a housing, and wherein the housing is configured to maintain a vacuum outside the isolation barrier.

6. The method of claim 1, further comprising:
   moving the induction coil to drive the control element to an overtravel position completely withdrawn from a reactor, wherein a plurality of magnetic overdrive latches engage a control rod assembly directly connected to the control element, wherein the engaging occurs when the control element is at the overtravel position, wherein the control element, the control rod assembly, and the plurality of magnetic overdrive latches are inside the isolation barrier.

7. The method of claim 6, further comprising:
   removing the control element from the control rod assembly, wherein the control element is at the overtravel position during the removing.

8. The method of claim 6, further comprising:
   energizing a plurality of overtravel induction coils to release the magnetic overdrive latches to disengage the control rod assembly, wherein the plurality of overtravel induction coils are outside the isolation barrier.

9. The method of claim 1, wherein the moving includes energizing a motor to rotate a linear screw to which the induction coil is connected.

10. The method of claim 9, wherein the induction coil is mounted on a vertical travel nut to move in a vertical distance as the linear screw rotates.

11. A method of moving a control element in a nuclear reactor, the method comprising:
    moving an induction coil outside of an isolation barrier, wherein the moving drives a magnet secured to the control element, wherein the control element and the magnet are inside of the isolation barrier such that the control element linearly moves inside the isolation barrier exactly with the induction coil, wherein the induction coil and the isolation barrier are sealed inside a housing, and wherein the housing is configured to maintain a vacuum outside the isolation barrier.

12. The method of claim 11, wherein the induction coil is in a vacuum environment, and wherein the control element is in a pressurized reactor environment.

13. The method of claim 11, further comprising:
    energizing the induction coil before the moving the induction coil.

14. The method of claim 13, further comprising:
de-energizing the induction coil to drive the control element by gravity into a reactor.

15. The method of claim 11, wherein the control rod drive includes a control rod assembly secured to the control element, and wherein the control rod assembly includes the magnet.

16. A method of moving a control element in a nuclear reactor, the method comprising:
moving an induction coil outside of an isolation barrier, wherein the moving drives a magnet secured to the control element, wherein the control element and the magnet are inside of the isolation barrier such that the control element linearly moves inside the isolation barrier exactly with the induction coil; and
moving the induction coil to drive the control element to an overtravel position completely withdrawn from a reactor, wherein a plurality of magnetic overdrive latches engage a control rod assembly directly connected to the control element at the overtravel position, wherein the control element, the control rod assembly, and the plurality of magnetic overdrive latches are inside the isolation barrier.

17. The method of claim 16, wherein the induction coil is in a vacuum environment, and wherein the control element is in a pressurized reactor environment.

18. The method of claim 16, further comprising:
energizing the induction coil before the moving the induction coil.

19. The method of claim 16, wherein the control rod drive includes a control rod assembly secured to the control element, and wherein the control rod assembly includes the magnet.

20. The method of claim 16, further comprising:
removing the control element from the control rod assembly, wherein the control element is at the overtravel position during the removing.

\* \* \* \* \*